United States Patent Office

2,957,128
Patented Oct. 18, 1960

2,957,128

MEASURING MEANS FOR PARAMAGNETIC GASES

William J. Spry, Jr., Berea, and Leonard S. Singer, Parma, Ohio, assignors to Union Carbide Corporation, a corporation of New York Filed June 27, 1958, Ser. No. 744,967

3 Claims. (Cl. 324—36)

This invention relates to means for detecting and determining the concentration of paramagnetic gases in gaseous mixtures.

The main object of this invention is to provide an instrument for detecting and measuring the concentration of paramagnetic gases, particularly oxygen, either alone or when in the presence of other gases.

Another object of the invention is to provide an instrument of the character described, which is non-destructive, simple in operation, compact and portable.

Broadly stated, the device of the invention consists of a plurality of Helmholtz coils with radio frequency oscillator means positioned at the center of the Helmholtz coils with its axis perpendicular to the Helmholtz fields, an audio (or ultra-sonic) frequency alternating current source in contact with one pair of Helmholtz coils and a source of direct current in contact with the other pair. A sample tube is positioned at a predetermined position with respect to the Helmholtz coils, and the audio frequency component of the oscillating output signal from a radio frequency coil is fed to an amplifier. The amplified audio signal can be viewed as a wave form on an oscilloscope screen or read as voltage on a voltmeter.

In developing the instant device, studies of the EPR (electron paramagnetic resonance) in charred sucrose at microwave frequencies suggested the possibility of making a simple and practical low frequency device for measuring the partial pressures of paramagnetic gases, particularly $O_2$.

The fundamental relation which must be satisfied in order to observe an EPR in a paramagnetic material is $\nu = KH$ where $\nu$ is the frequency of the R.F. field, H is the static magnetic field, and K is a constant for a given material. Thus, for a given material, use of a lower frequency requires the use of a correspondingly lower magnetic field.

It was found that paramagnetic gases induced a reversible broadening of the EPR of charred materials, such that the resonance line width appeared to be a well behaved function of gas pressure, and was independent of the presence of several other gases including nitrogen, carbon dioxide and chlorine. For example, the line width as a function of oxygen pressure for a sample of sucrose charred in argon at 670° C. for ½ hour was found to be $$W = W_0 + 5.4 P_{O_2}$$

where $W_0$ is the line width at zero oxygen pressure and is equal to 3.0 gauss for this material, and $P_{O_2}$ is the oxygen pressure in mm. of mercury.

In this case, the height of the absorption undergoes a corresponding change since the total integrated absorption remains approximately constant. In other words, the height of an absorption curve has the approximate pressure dependence:

$$I = \frac{C}{W_0 + 5.4 P_{O_2}}$$

where C is a constant characteristic of the particular char and experimental apparatus.

Depending upon the charring conditions, both the initial width and the dependency on pressure can be changed.

An interesting feature of the above relation is that the resonance is so sharp and strong that a simple low-magnetic field apparatus can be used for detection purposes.

Figure 1:
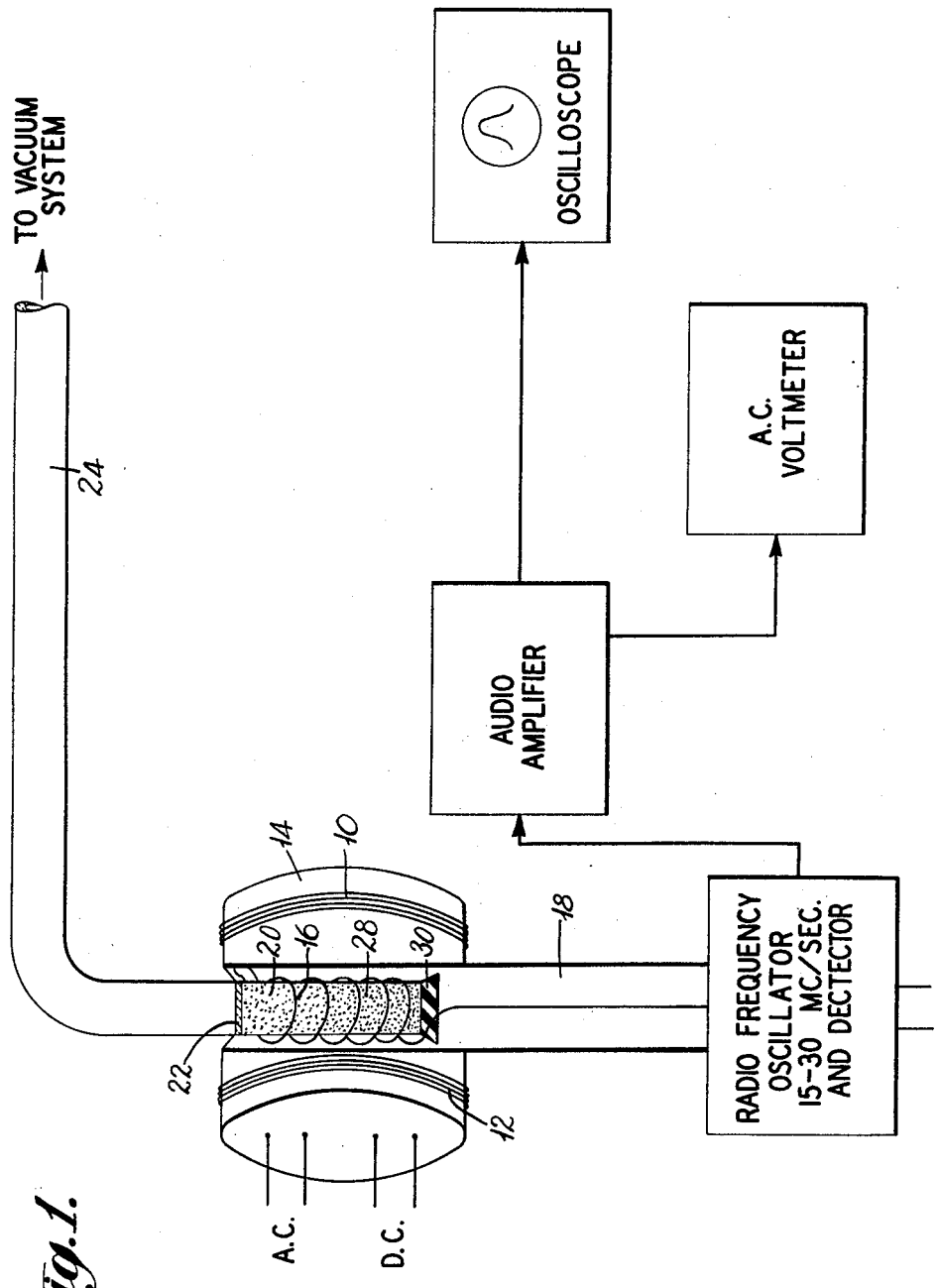
Fig. 1 is a schematic representation of an embodiment of the invention.

A regenerative oscillator-detector system making use of the above principles is shown in Fig. 1. Two pairs of Helmholtz coils were wound on a plastic coil form 14 as shown in the figure. The oscillator tank coil 16 was placed at the center of the Helmholtz coils with its axis perpendicular to the Helmholtz field. One pair of Helmholtz coils was connected to a 60 cycle/sec. A.C. source capable of providing an alternating magnetic field of up to 30 gauss. The other pair of Helmholtz coils was connected to a D.C. source (storage battery) and provided static magnetic fields up to 30 gauss.

The radio frequency coil 16, which produces a small oscillating magnetic field perpendicular to the Helmholtz coil magnetic field, is supported within a brass tube 18. The R.F. coil is constructed of ten turns of copper wire, helically wound and supported on a thin-walled form 20. Brass tube 18 serves as a shield for the coil (which is grounded to the tube) and also as the outer conductor of a coaxial line connecting the R.F. coil to the rest of the oscillator. Lamination of the brass tube eliminates induced currents which might affect the signal voltage.

The particular oscillator used operated in the 15 to 20 megacycle per second region; however, different operating frequencies, which change the sensitivity of the device, can be realized by changing the number of turns in the R.F. coil and altering the capacitance in the oscillating circuit. It should be pointed out that any change in frequency must be accompanied by a corresponding change in the D.C. magnetic field (given by $H = \nu / K$). Thus the D.C. power supplied to the Helmholtz coils would also be correspondingly altered.

When the oscillator is tuned to the resonance frequency and the D.C. magnetic field is adjusted to the corresponding resonant value, energy is absorbed from the R.F. oscillating magnetic field, causing a change in voltage across the R.F. coil. This voltage is modulated at a 60 cycle per second rate by the Helmholtz modulating coils and the resultant audio signal is fed into a suitable amplifier such as a Ballantine decade amplifier, which is capable of an amplification of 10 or 100 times. The amplified signal may be viewed as a wave form on the oscilloscope screen or read as actual voltage on the A.C. voltmeter.

The sample tube which is fitted with a fritted glass disk 22 filled with the char 28, and closed by a rubber stopper 30, is situated so that the sample is centered with respect to both the Helmholtz coils and the R.F. coils. Glass tubing 24 connects the sample tube to the system whose paramagnetic gas partial pressure is to be determined.

For this particular case, the chars were prepared from sucrose by partially carbonizing the same in an inert atmosphere at temperatures between 500° and 700° C. The thus-formed char was placed in the sample holder. Next the gaseous mixture containing the paramagnetic gas, the amount and pressure of which was desired, was admitted to the sample chamber through tube 24. The gas affects the EPR of the char by interacting (perhaps a very weak physical adsorption interaction) with the char surface to produce a change in both the width and height of the EPR signal. Thus, when the frequency of the oscillator and the value of the D.C. magnetic field are adjusted so that an EPR signal due to the char is observed on the voltmeter, a change in this voltage is noted when a paramagnetic gas comes in contact with the char surface.

Figure 2:
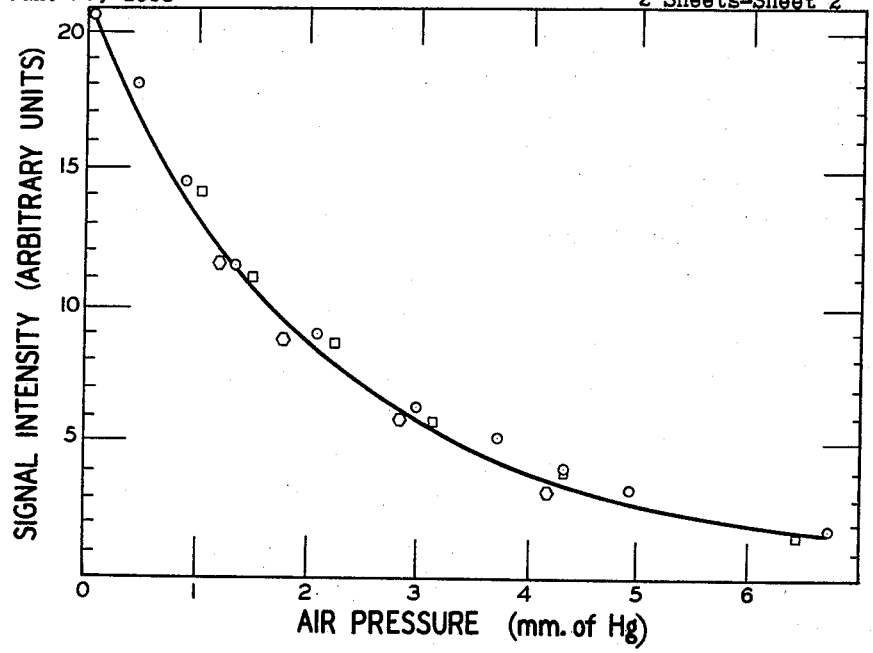
Figs. 2 and 3 are curves showing typical performances of the device.
Figure 3:
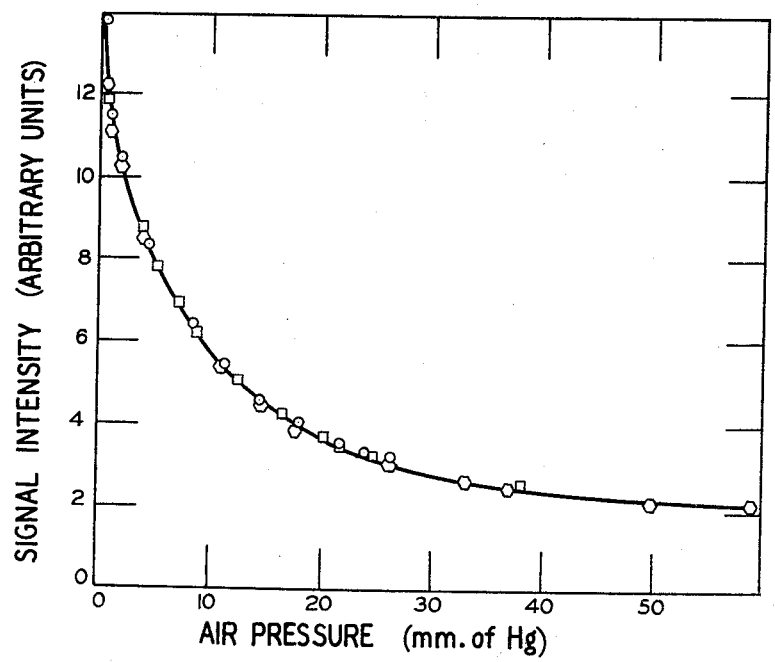

Figs. 2 and 3 show data obtained by this method. After a maximum resonance signal was obtained for the sucrose char in an evacuated tube, air was allowed to fill the system. A series of readings of the signal voltage and the corresponding air pressure (on a low density oil manometer) was taken as the air was pumped from the system. The sharpest line appeared when a surcose char produced at 650° C. was employed. Fig. 2 shows the sensitive region to exist from 0–5 mm. (Hg) air pressure. Sucrose charred at 600° C. had a much greater range of sensitivity, from 0–20 mm. (Hg) air pressure, as is illustrated in Fig. 3. Results were quite reproducible as can be appreciated from the various trials represented in the graphs by different geometric symbols, circles, squares and hexagons. The accuracy of measurement obtained here for the pressure range of 0.1 to 30 mm. Hg was of the order of a few percent.

Figs. 2 and 3 are the calibrating data obtained for a given char and apparatus. For actual operation of the device, a similar procedure is followed for the unknown gas. A certain reading on the voltmeter is observed and the reading is converted to air pressure or $O_2$ concentration by appropriate calibration curves similar to Figs. 2 or 3. A more direct method of operation consists in having the indicating meter actually calibrated in pressure or percent $O_2$ units.

Qualitative experiments on flow systems indicated that the instrument can conveniently be employed to measure the partial pressure of small amounts of oxygen or other paramagnetic gases in the presence of much larger quantities of diamagnetic gases, including perhaps those of a corrosive nature, where the total pressure is of the order of atmospheric pressure. For measurements in a flow system, the rubber stopper 30 would simply be modified by introducing a small exit gas hole.

As is indicated by the results in Figs. 2 and 3, chars produced at different temperatures may be chosen for various pressure ranges and sensitivities. Char preparations are relatively simple; therefore, the properties of various chars, calibrations, and limitations of the instrument can be quickly determined. Materials other than sucrose and charring temperatures and methods of charring other than those indicated can be used for the char preparation without altering the basic nature of the invention; however, this substance appeared to be the most intelligent choice on the basis of present knowledge of the EPR properties of charred materials.

This instrument can also be employed as a vacuum gauge on any type of evacuated system. By contrast some prior art oxygen detecting devices can be used only at high pressures in a flow system and cannot be employed in vacuum systems where the total supply of gas is limited.

What is claimed is:

1. Apparatus for the detection and determination of the concentration of a paramagnetic gas present in gaseous mixtures comprising means for producing an alternating magnetic field, means for producing a static magnetic field, variable radio frequency coil means disposed perpendicularly to said magnetic fields, sample holding means centered with respect to said fields and coil and containing a charred material, conduit means for conveying a gaseous mixture containing a paramagnetic gas to said sample holding means, and means responsive to a signal when said adjustable radio frequency coil is tuned to the resonance frequency of said charred material.

2. The apparatus of claim 1 wherein said means for producing an alternating magnetic field consist of at least one Helmholtz coil.

3. The apparatus of claim 1 wherein said radio frequency coil is supported within a laminated brass tube serving as a shield therefor.

References Cited in the file of this patent

UNITED STATES PATENTS

| | | |
|---|---|---|
| 2,645,563 | Jensen | July 14, 1953 |
| 2,772,393 | Davis | Nov. 27, 1956 |